(12) United States Patent
Iwasawa et al.

(10) Patent No.: US 11,482,799 B2
(45) Date of Patent: Oct. 25, 2022

(54) TERMINAL-EQUIPPED ELECTRIC WIRE AND METHOD OF MANUFACTURING TERMINAL-EQUIPPED ELECTRIC WIRE

(71) Applicant: Yazaki Corporation, Tokyo (JP)

(72) Inventors: Hidehiko Iwasawa, Shizuoka (JP); Masao Nagano, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 1 day.

(21) Appl. No.: 17/207,766

(22) Filed: Mar. 22, 2021

(65) Prior Publication Data
US 2021/0296795 A1 Sep. 23, 2021

(30) Foreign Application Priority Data
Mar. 23, 2020 (JP) .............................. JP2020-050971

(51) Int. Cl.
| | |
|---|---|
| *H01R 4/18* | (2006.01) |
| *B05D 3/06* | (2006.01) |
| *H01R 4/70* | (2006.01) |
| *H01R 43/00* | (2006.01) |
| *H01R 43/048* | (2006.01) |

(52) U.S. Cl.
CPC ............ *H01R 4/185* (2013.01); *B05D 3/067* (2013.01); *H01R 4/70* (2013.01); *H01R 43/005* (2013.01); *H01R 43/048* (2013.01)

(58) Field of Classification Search
CPC ........ H01R 4/185; H01R 4/70; H01R 43/005; H01R 43/048; B05D 3/067

USPC .......................................................... 439/877
See application file for complete search history.

(56) References Cited

U.S. PATENT DOCUMENTS

| | | | | |
|---|---|---|---|---|
| 7,160,150 B2 * | 1/2007 | Annequin | ............ | H01R 43/048 439/585 |
| 8,616,928 B2 * | 12/2013 | Uchiyama | .............. | H01R 4/184 439/877 |
| 8,927,863 B2 * | 1/2015 | Tanikawa | ................. | H01R 4/70 174/74 A |
| 8,974,258 B2 * | 3/2015 | Mitose | .................... | H01R 4/18 439/877 |

(Continued)

FOREIGN PATENT DOCUMENTS

| | | | | |
|---|---|---|---|---|
| DE | 102010009284 A1 * | 8/2011 | ............ | H01R 4/185 |
| EP | 3113287 A1 * | 1/2017 | ............ | H01R 4/187 |

(Continued)

*Primary Examiner* — Peter G Leigh
(74) *Attorney, Agent, or Firm* — Kenealy Vaidya LLP

(57) ABSTRACT

In a terminal-equipped electric wire in which a first barrel of a crimp terminal is crimped to a core wire exposed portion of an electric wire, a second barrel of the crimp terminal is crimped to a covering portion of the electric wire, and an anticorrosive portion is formed at least in an opening portion between the first barrel and the second barrel, an adhesive member is arranged on an outer peripheral surface of the covering portion, a base member and adhesive layers of the adhesive member are held in an elastically deformed state by being crimped by the second barrel, the inner adhesive layer of the adhesive member adheres to the entire circumference of the outer peripheral surface of the covering portion, and the outer adhesive layer of the adhesive member adheres to the entire circumference of an inner peripheral surface of the second barrel.

2 Claims, 8 Drawing Sheets

(56) References Cited

U.S. PATENT DOCUMENTS

| | | | |
|---|---|---|---|
| 9,209,615 B2 * | 12/2015 | Ono | H01R 4/70 |
| 9,293,838 B2 * | 3/2016 | Sakaguchi | H01R 4/183 |
| 9,325,085 B2 * | 4/2016 | Tanaka | H01R 43/28 |
| 9,397,437 B2 * | 7/2016 | Ohnuma | H01R 4/187 |
| 9,543,689 B2 * | 1/2017 | Sato | H01R 13/5213 |
| 9,570,870 B2 * | 2/2017 | Kawamura | H01R 4/187 |
| 9,755,327 B2 * | 9/2017 | Aoki | H01R 4/62 |
| 9,768,524 B2 * | 9/2017 | Seipel | H01R 4/188 |
| 9,774,101 B2 * | 9/2017 | Yoshida | H01R 4/185 |
| 9,780,461 B2 * | 10/2017 | Yoshida | H01R 4/185 |
| 9,853,368 B2 * | 12/2017 | Myer | H01R 4/188 |
| 10,236,652 B2 * | 3/2019 | Saito | H01R 4/185 |
| 10,355,373 B2 * | 7/2019 | Iwasawa | H01R 4/70 |
| 10,381,794 B2 * | 8/2019 | Saito | H01R 43/058 |
| 10,498,048 B2 * | 12/2019 | Washio | H01R 43/048 |
| 10,511,131 B2 * | 12/2019 | Anma | H01R 43/058 |
| 2010/0120302 A1 * | 5/2010 | Kumakura | H01R 4/185 439/878 |
| 2016/0359245 A1 * | 12/2016 | Aoki | H01R 13/5216 |
| 2018/0109088 A1 * | 4/2018 | Takayanagi | H01R 43/048 |
| 2018/0261931 A1 * | 9/2018 | Iwata | H01R 4/184 |
| 2018/0375275 A1 * | 12/2018 | Onuma | H01R 43/005 |
| 2018/0375276 A1 * | 12/2018 | Onuma | H01R 43/005 |
| 2019/0013595 A1 * | 1/2019 | Iwata | H01R 4/188 |
| 2019/0305440 A1 * | 10/2019 | Shinohara | H01R 13/03 |

FOREIGN PATENT DOCUMENTS

| | | | | |
|---|---|---|---|---|
| JP | 2013-8610 A | | 1/2013 | |
| JP | 2015153716 A | * | 8/2015 | |
| JP | 2015153721 A | * | 8/2015 | |
| JP | 2018-6160 A | | 1/2018 | |
| JP | 2019-9026 A | | 1/2019 | |
| WO | WO-2010024032 A1 | * | 3/2010 | H01R 4/185 |
| WO | WO-2011025046 A1 | * | 3/2011 | H01R 4/185 |
| WO | WO-2014021278 A1 | * | 2/2014 | H01R 4/04 |
| WO | 2014/129603 A1 | | 8/2014 | |
| WO | WO-2014154706 A1 | * | 10/2014 | H01R 4/185 |
| WO | WO-2015141614 A1 | * | 9/2015 | H01R 13/5216 |

* cited by examiner

TERMINAL-EQUIPPED ELECTRIC WIRE AND METHOD OF MANUFACTURING TERMINAL-EQUIPPED ELECTRIC WIRE

CROSS-REFERENCE TO RELATED APPLICATION(S)

The present application claims priority to and incorporates by reference the entire contents of Japanese Patent Application No. 2020-050971 filed in Japan on Mar. 23, 2020.

BACKGROUND OF THE INVENTION

1. Field of the Invention

The present invention relates to a terminal-equipped electric wire and a method of manufacturing a terminal-equipped electric wire.

2. Description of the Related Art

Conventionally, there is a terminal-equipped electric wire having an electric wire and a crimp terminal that is mechanically and electrically connected to a core wire exposed portion and a covering portion of the electric wire by crimping. The electric wire and the crimp terminal are electrically connected by being crimped by a terminal crimping device. This type of terminal-equipped electric wire is required to prevent water from entering between the core wire exposed portion of the electric wire and the crimp terminal. For example, in a technique of Japanese Patent Application Laid-open No. 2019-009026, a region from a core wire exposed portion of an electric wire to a barrel piece on a covering portion side is covered with a photo-curable resin (hereinafter, an anticorrosive agent) to prevent entry of water from the outside.

This type of terminal-equipped electric wire needs to maintain preventing the entry of water after crimping. However, there is a possibility that a gap between a covering portion and a crimp terminal and between the cured anticorrosive agent and the covering portion widens due to the influence of shrinkage of the covering portion due to heat or the like or volatilization of a plasticizer contained in the covering portion after the crimping. As a result, there is a possibility that water enters, for example, from a rear end side of a terminal and flows toward the core wire exposed portion.

SUMMARY OF THE INVENTION

The present invention has been made in view of the above, and an object thereof is to provide a terminal-equipped electric wire that prevents flow of water from a rear end side of a terminal toward a core wire exposed portion even if a gap between a covering portion and a crimp terminal and between a cured anticorrosive agent and the covering portion widens due to shrinkage of the covering portion caused by heat or deterioration over time after crimping.

In order to achieve the above mentioned object, a terminal-equipped electric wire according to one aspect of the present invention includes an electric wire that has a core wire made of a conductor and a covering portion made of an insulating material covering a periphery of the core wire; and a crimp terminal that has a base portion extending along an axial direction; a first barrel which extends from the base portion in an intersecting direction that intersects the axial direction, and is crimped in a state of surrounding an outer circumference of a core wire exposed portion in which an outer peripheral surface of the core wire in the electric wire located between the first barrel and the base portion is exposed to the outside; a second barrel which extends from the base portion in the intersecting direction, is located on a rear side of the first barrel in the axial direction, and is crimped in a state of surrounding an outer circumference of the covering portion of the electric wire; and an opening portion in which the core wire exposed portion and the covering portion are exposed to an outside between the first barrel and the second barrel, wherein an anticorrosive portion made of an insulating material is formed so as to cover at least the opening portion, an adhesive member having a base member and adhesive layers formed on both sides of the base member is arranged on the covering portion, and the adhesive member is held in an elastically deformed state in a state where the second barrel crimps the covering portion, an inner adhesive layer adheres to the outer circumference of the covering portion, and an outer adhesive layer adheres to an inner circumference of the second barrel so as to follow an inner peripheral surface in the state where the second barrel crimps the covering portion.

According to another aspect of the present invention, in the terminal-equipped electric wire, it is possible to configure that the adhesive member is arranged from a region where at least the covering portion and the second barrel overlap to a rear side from a rear end of the second barrel in the axial direction.

In order to achieve the above mentioned object, a method of manufacturing a terminal-equipped electric wire that includes an electric wire having a core wire made of a conductor and a covering portion made of an insulating material covering a periphery of the core wire, and a crimp terminal having: a base portion extending along an axial direction; a first barrel which extends from the base portion in an intersecting direction that intersects the axial direction, and is crimped in a state of surrounding an outer circumference of a core wire exposed portion in which an outer peripheral surface of the core wire in the electric wire located between the first barrel and the base portion is exposed to the outside; a second barrel which extends from the base portion in the intersecting direction, is located on a rear side of the first barrel in the axial direction, and is crimped in a state of surrounding an outer circumference of the covering portion of the electric wire; and an opening portion in which the core wire exposed portion and the covering portion are exposed to an outside between the first barrel and the second barrel, the method according to still another aspect of the present invention includes a peeling step of peeling the covering portion of the electric wire to form a core wire exposed portion; an adhesive member pasting step of pasting an adhesive member having a base member and adhesive layers formed on both sides of the base member to the covering portion of the electric wire such that the adhesive layer wraps a whole circumference of the covering portion; a placing step of placing the electric wire with respect to the crimp terminal before crimping such that the second barrel and the adhesive member overlap; a crimping step of crimping the electric wire and the crimp terminal before crimping; and an anticorrosive portion forming step of applying an anticorrosive agent to at least the opening portion and curing the anticorrosive agent to form an anticorrosive portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a terminal-equipped electric wire according to the present invention will be described in detail with reference to the drawings. Incidentally, the invention is not limited by the examples.

Embodiment

Figure 1:
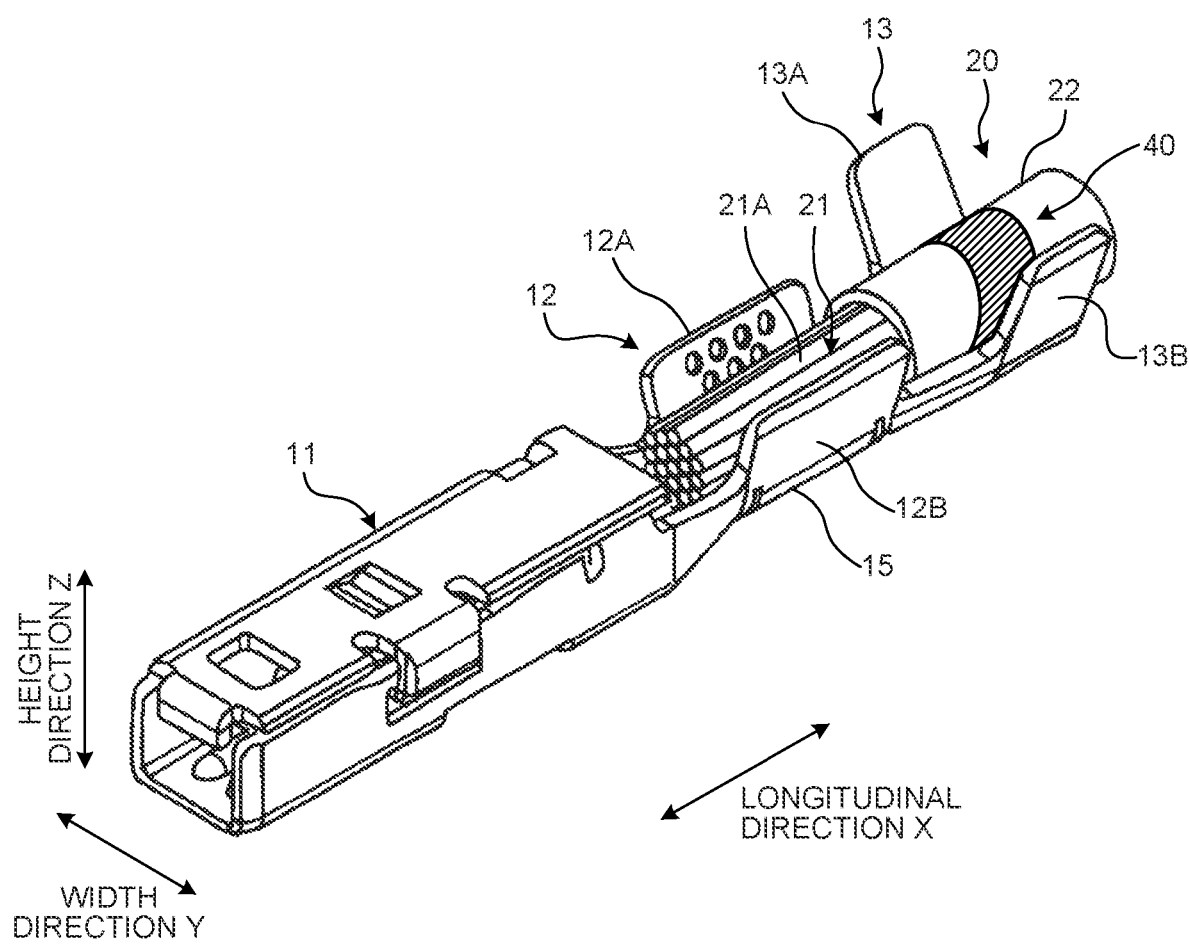
FIG. 1 is a perspective view illustrating a terminal-equipped electric wire before crimping according to an embodiment.
Figure 3:
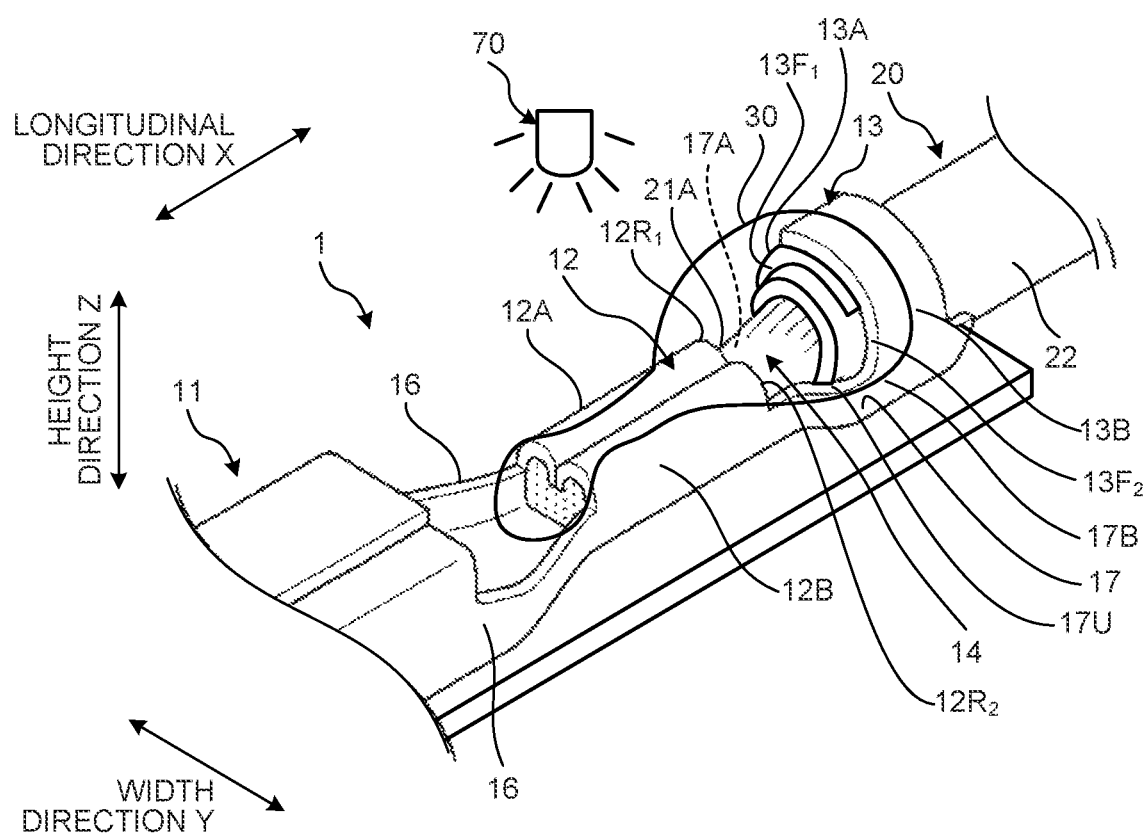
FIG. 3 is a perspective view illustrating the terminal-equipped electric wire after crimping according to the embodiment.

As illustrated in FIG. 1, a crimp terminal 1 according to the present embodiment has a terminal connection portion 11, a first barrel 12, and a second barrel 13. The terminal connection portion 11, the first barrel 12, and the second barrel 13 are arrayed in this order at intervals along a longitudinal direction of the crimp terminal 1. The terminal connection portion 11 is arranged at a front end of the crimp terminal 1 in the longitudinal direction, and the second barrel 13 is arranged at a rear end of the crimp terminal in the longitudinal direction. As illustrated in FIG. 3, the terminal connection portion 11 and the first barrel 12 are connected by a pair of first side walls 16, and the first barrel 12 and the second barrel 13 are connected by a pair of second side walls 17. An opening portion 14 is formed between the first barrel 12 and the second barrel 13. The crimp terminal 1 is made of a plate material using conductive metal (for example, a copper plate or a copper alloy plate) as a base member. The crimp terminal 1 is formed into a predetermined shape by punching or bending the base member. The surface of the crimp terminal 1 may be plated with tin (Sn), silver (Ag), or the like.

In the present specification, in the description of the crimp terminal 1, a connection direction with a counterpart terminal (not illustrated), that is, an insertion direction with the counterpart terminal is referred to as a longitudinal direction X. A width direction of the crimp terminal 1 is referred to as a width direction Y. The width direction Y is orthogonal to the longitudinal direction X. A height direction of the crimp terminal 1 is referred to as a height direction Z. The height direction Z is orthogonal to both the longitudinal direction X and the width direction Y.

The terminal connection portion 11 is a portion that is electrically connected to the counterpart terminal. As illustrated in FIG. 1, a shape of the terminal connection portion 11 of the present embodiment is a rectangular cylindrical shape and is a so-called female terminal, but the terminal connection portion 11 is not limited thereto, and may be a tab of a male terminal (not illustrated). The first barrel 12 is a portion that is crimped to a core wire exposed portion 21A of an electric wire 20 which will be described later. The electric wire 20 has a core wire 21 and a covering portion 22. A material of the core wire 21 is, for example, copper or aluminum. In the electric wire 20 to be crimped by the crimp terminal 1, the core wire 21 is exposed from the covering portion 22 by a predetermined length as a core wire exposed portion 21A in which the covering portion 22 at an end is removed and the outer circumference of the core wire 21 is exposed to the outside. The core wire 21 of the present embodiment is an aggregate of a plurality of strands. However, the core wire 21 may be a single wire such as a coaxial cable. Further, the plurality of strands may be all made of the same material, or may be made of different materials. The crimp terminal 1 is electrically connected to the core wire 21 by being crimped to the core wire exposed portion 21A of the electric wire 20.

A shape of the first barrel 12 before being crimped to the core wire 21 is a U-shape as illustrated in FIG. 1. The first barrel 12 is formed so as to extend from a part of the base portion 15 extending in the longitudinal direction X, and has a first core wire caulking portion 12A and a second core wire caulking portion 12B. The base portion 15 is a bottom wall of the first barrel 12 and is supported by an anvil 52 which will be described later. The first core wire caulking portion 12A and the second core wire caulking portion 12B are a pair of caulking pieces that are caulked to the core wire exposed portion 21A. The first core wire caulking portion 12A is a side wall protruding from one end of the base portion 15 in the width direction Y. The second core wire caulking portion 12B is a side wall protruding from the other end of the base portion 15 in the width direction Y. The first core wire caulking portion 12A and the second core wire caulking portion 12B extend in a direction intersecting the longitudinal direction X of the base portion 15. The first core wire caulking portion 12A and the second core wire caulking portion 12B face each other in the width direction Y. As illustrated in FIG. 1, a distance between the first core wire caulking portion 12A and the second core wire caulking portion 12B increases from the base portion 15 toward the distal side.

Figure 2:
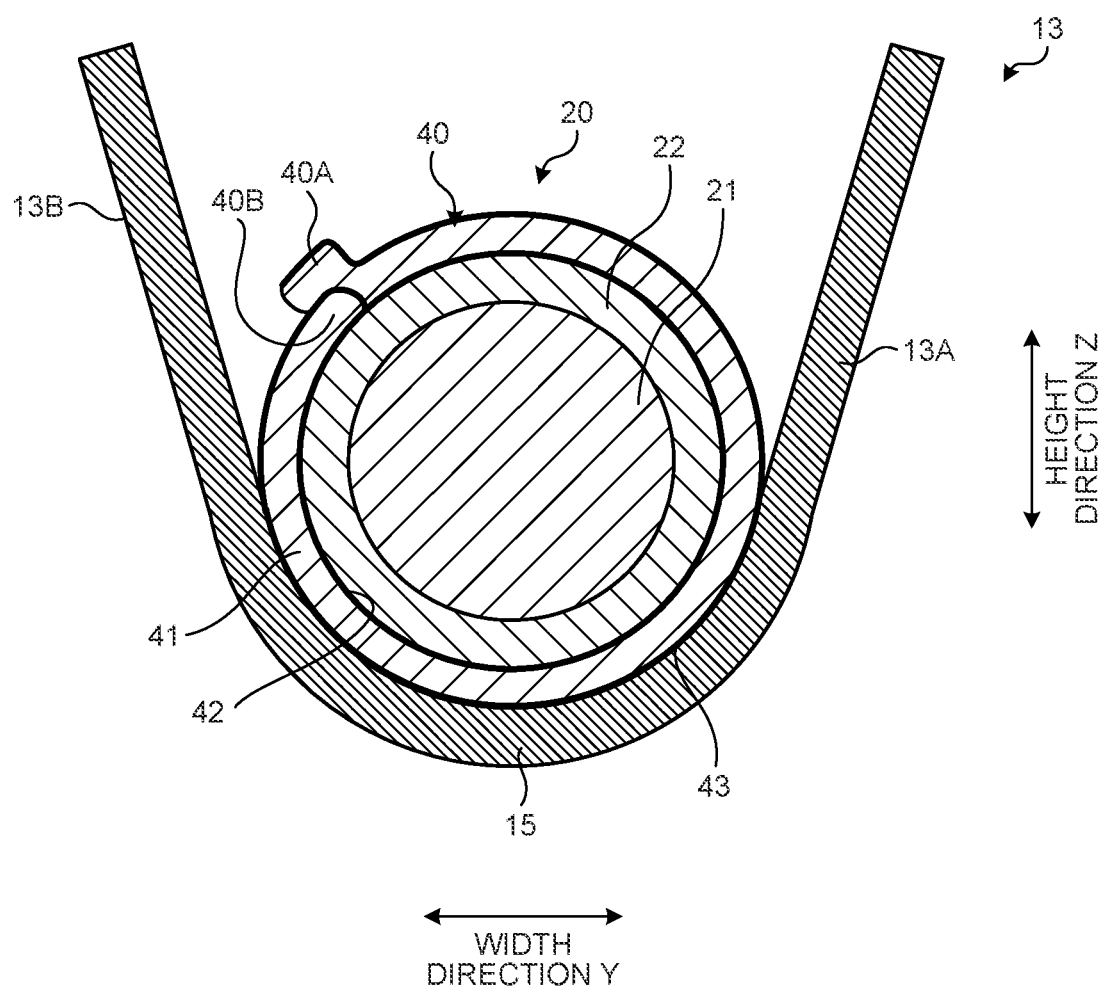
FIG. 2 is a cross-sectional view of a plane in a width direction Y and a height direction Z illustrating a second barrel before crimping according to the embodiment.

As illustrated in FIG. 1, the second barrel 13 is formed so as to extend from a part of the base portion 15, and has a first covering caulking portion 13A and a second covering caulking portion 13B. As illustrated in FIG. 2, a shape of the second barrel 13 before being crimped to the covering portion 22 with an adhesive member 40 interposed therebetween, which will be described later, is a U-shape. The base portion 15 is also a bottom wall of the second barrel 13. The first covering caulking portion 13A is a side wall protruding from one end of the base portion 15 in the width direction Y. The second covering caulking portion 13B is a side wall protruding from the other end of the base portion 15 in the width direction Y. The first covering caulking portion 13A and the second covering caulking portion 13B extend in a direction intersecting the longitudinal direction X of the base portion 15. The first covering caulking portion 13A and the second covering caulking portion 13B face each other in the width direction Y. A distance between the first covering caulking portion 13A and the second covering caulking portion 13B increases toward the end side of the base portion 15.

As illustrated in FIG. 3, the terminal connection portion 11 and the first barrel 12 are connected via the pair of first side walls 16. A height of the first side wall 16 is lower than either a height of the terminal connection portion 11 or a height of the first barrel 12. The first barrel 12 and the second barrel 13 are connected to each other via the pair of second side walls 17. The first side wall 16 and the second side wall 17 extend from the base portion 15. The base portion 15 is also a bottom wall of the first side wall 16. The second side walls 17 extend from both sides of the base portion 15 in the width direction Y. The base portion 15 is also a bottom wall of the second side wall 17. One 17A of the second side walls connects the first core wire caulking portion 12A and the first covering caulking portion 13A. The other 17B of the second side wall 17 connects the second core wire caulking portion 12B and the second covering caulking portion 13B. A height of the second side wall 17 is lower than any of heights of the caulking portions 12A and 12B of the first barrel 12 and heights of the caulking portions 13A and 13B of the second barrel 13.

The crimp terminal 1 has the opening portion 14 between the first barrel 12 and the second barrel 13 in the longitudinal direction X. Specifically, as illustrated in FIG. 3, the opening portion 14 is formed by a region surrounded by a rear end 12R$_1$ of the first core wire caulking portion 12A, a rear end 12R$_2$ of the second core wire caulking portion 12B, upper ends 17U of the pair of second side walls 17, a front end 13F$_1$ of the first covering caulking portion 13A, and a front end 13F$_2$ of the second covering caulking portion 13B. When the opening portion 14 is viewed from the upper side in the height direction Z or from the width direction Y after the crimp terminal 1 and the electric wire 20 are crimped, a part of the core wire exposed portion 21A and a part of the covering portion 22 are exposed from the crimp terminal 1, that is, exposed to the outside.

Figure 6:
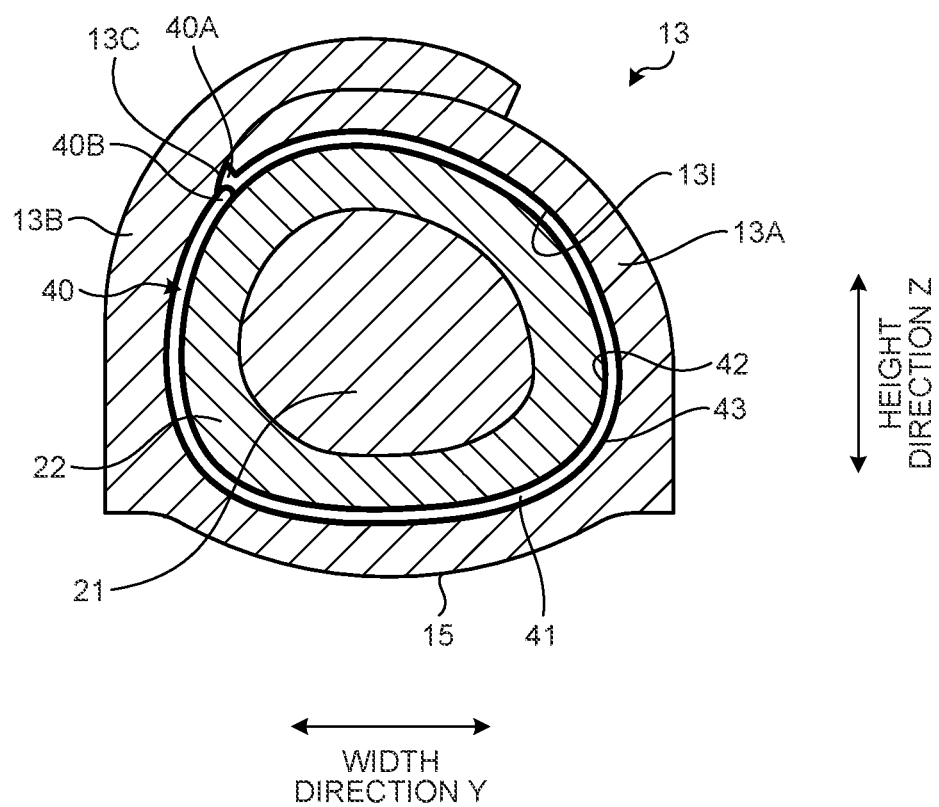
FIG. 6 is a cross-sectional view of a plane in the width direction Y and the height direction Z illustrating the second barrel after crimping according to the embodiment.
Figure 7:
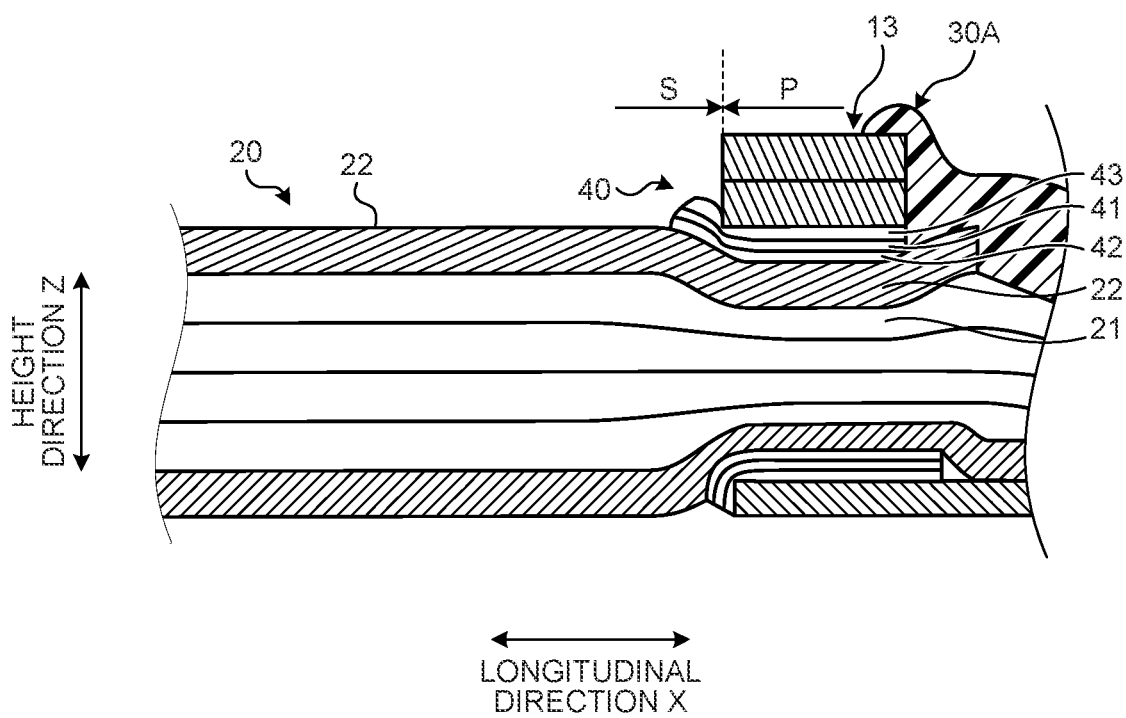
FIG. 7 is a cross-sectional view of a plane in a longitudinal direction X and the height direction Z illustrating the second barrel after crimping according to the embodiment.

As illustrated in FIG. 7, the adhesive member 40 in the present embodiment is configured such that an inner adhesive layer 42, a base member 41, an outer adhesive layer 43, and release paper (not illustrated) are stacked in this order, and stored in a state of being wound around a core (not illustrated). The release paper is provided between the inner adhesive layer 42 and the outer adhesive layer 43 such that the inner adhesive layer 42 does not adhere to the outer adhesive layer 43 in the state where the adhesive member 40 is wound around the core. The adhesive member 40 is pasted to the entire outer peripheral surface of the covering portion 22 of the electric wire 20. When being pasted to the outer peripheral surface of the covering portion 22, ends 40A and 40B of the adhesive member 40 are pasted in a state of overlapping with each other as illustrated in FIG. 2. The adhesive member 40 is caulked together with the covering portion 22 by the second barrel 13 of the crimp terminal 1. In a state where the electric wire 20 is crimped to the crimp terminal 1, the inner adhesive layer 42 of the adhesive member 40 adheres to the entire outer peripheral surface of the covering portion 22 as illustrated in FIG. 6. The outer adhesive layer 43 adheres to the inner circumference of the second barrel 13 so as to follow an inner peripheral surface 13I in the state where the second barrel 13 crimps the covering portion 22. Further, after crimping, the base member 41, the inner adhesive layer 42, and the outer adhesive layer 43 are held by the second barrel 13 while being elastically deformed in the radial direction in a cross-sectional view along the width direction Y and the height direction Z. The base member 41 is made of, for example, a non-woven fabric, cellulose, or the like. The inner adhesive layer 42 and the outer adhesive layer 43 are made of an acrylic or polyester-based material. The materials forming the base member 41, the inner adhesive layer 42, and the outer adhesive layer 43 are not limited to the above-described materials as long as having enough elasticity to elastically deform at the time of being caulked to the second barrel 13 in a crimping step which will be described later.

Incidentally, it is preferable that the adhesive member 40 be arranged at least from a region where the covering portion 22 and the second barrel 13 overlap to the rear side from a rear end of the second barrel 13 in the longitudinal direction X. With such a configuration, the adhesive member 40 is divided into two regions of a region P directly crimped by the second barrel 13 and a region S that is not directly crimped in the longitudinal direction X as illustrated in FIG. 7. The regions P and S are separated by a rear end of the second barrel 13. The adhesive member 40 in the region P is crimped by the second barrel 13, and thus, is deformed circumferentially inward with respect to the adhesive member 40 in the region S. Therefore, the adhesive member 40 in the region S bulges circumferentially outward as compared with the adhesive member 40 in the region P. As a result, the outer adhesive layer 43 of the adhesive member 40 in the region S also adheres to an end surface of the rear end of the second barrel 13, and the adhesive area between the second barrel 13 and the adhesive member 40 increases, thereby further improving a waterproof effect in the present invention.

As illustrated in FIG. 1, the electric wire 20 is placed on the crimp terminal 1 such that the axial direction of the electric wire 20 coincides with the longitudinal direction X of the crimp terminal 1. A distal end of the core wire 21 is directed toward the terminal connection portion 11 in the state of being placed on the crimp terminal 1. The core wire exposed portion 21A exposed to the outside from the covering portion 22 is placed on the first barrel 12. At this time, the distal end of the core wire 21 may protrude from the first barrel 12 toward the terminal connection portion 11. The covering portion 22 of the electric wire 20 is arranged on the second barrel 13 with the adhesive member 40, pasted to the outer circumference of the covering portion 22, interposed therebetween.

Figure 4:
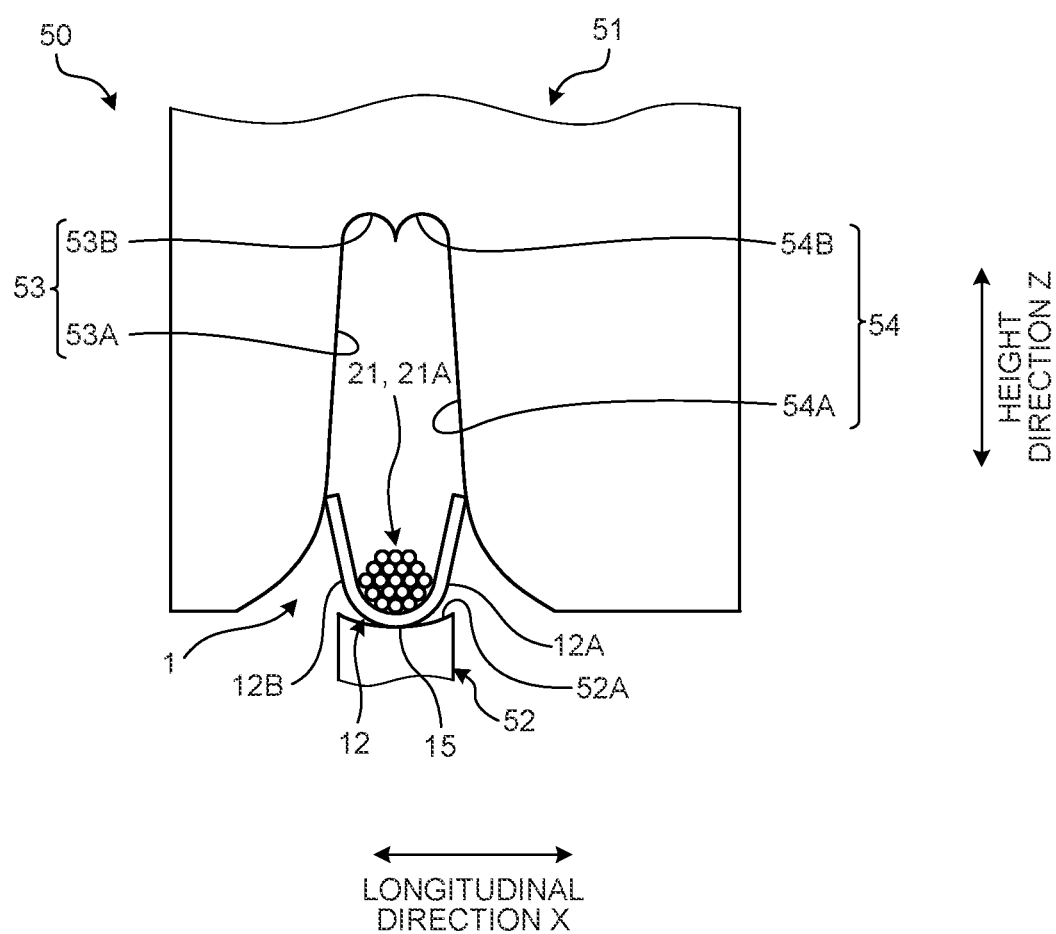
FIG. 4 is a view illustrating a terminal crimping device according to the embodiment.

The first barrel 12 and the second barrel 13 are crimped to the electric wire 20 by the anvil 52 and a crimper 51 illustrated in FIG. 4. The anvil 52 and the crimper 51 are components of a terminal crimping device 50. The anvil 52 is a mold that supports the first barrel 12 and the second barrel 13 from below. A support surface 52A of the anvil 52 supports an outer peripheral surface of the base portion 15 of the first barrel 12. Therefore, the first core wire caulking portion 12A and the second core wire caulking portion 12B are in a posture of extending diagonally upward from the base portion 15 in the state where the first barrel 12 is supported by the anvil 52. The anvil 52 similarly supports the second barrel 13 from below.

The crimper 51 is a mold that sandwiches the crimp terminal 1 and the electric wire 20 with the anvil 52 and crimps the crimp terminal 1 to the electric wire 20. The crimper 51 sandwiches the first barrel 12 and the core wire exposed portion 21A with the anvil 52 and crimps the first barrel 12 to the core wire exposed portion 21A. Similarly, the crimper 51 sandwiches the second barrel 13, the adhesive member 40, and the covering portion 22 with the anvil 52 and crimps the second barrel 13 to the covering portion 22. As illustrated in FIG. 4, the crimper 51 is located above the anvil 52. The crimper 51 moves relative to the anvil 52 along the height direction Z. The terminal crimping device 50 has a driving device (not illustrated) that moves the crimper 51 up and down in the height direction Z.

As illustrated in FIG. 3, an anticorrosive portion 30A is formed by applying a liquid anticorrosive agent 30 to the crimp terminal 1 to which the electric wire 20 has been crimped, and then, curing the anticorrosive agent 30. In the terminal-equipped electric wire of the present embodiment, the anticorrosive portion 30A is formed from the distal end of the core wire exposed portion 21A to the opening portion 14 in the longitudinal direction X. The anticorrosive portion 30A is formed so as to cover at least the opening portion 14. More specifically, the anticorrosive portion 30A is formed so as to cover the region surrounded by the rear end 12R$_1$ of the first core wire caulking portion 12A, the rear end 12R$_2$ of the second core wire caulking portion 12B, the upper ends 17U of the pair of second side walls 17, the front end 13F$_1$ of the first covering caulking portion 13A, and the front end 13F$_2$ of the second covering caulking portion 13B. The anticorrosive portion 30A blocks the core wire exposed portion 21A exposed from the opening portion 14 from the external space, and restricts, for example, moisture or the like from entering from the rear end side of the second barrel 13 over the upper part of the second barrel 13 toward the core wire exposed portion 21A.

It is preferable that the anticorrosive portion 30A be also formed at a site where the core wire exposed portion 21A is exposed from the first barrel 12. In this case, the anticorrosive portion 30A blocks the site of the core wire exposed portion 21A exposed from the first barrel from the external space, and restricts moisture or the like from entering from the terminal connection portion 11 side.

Figure 5:
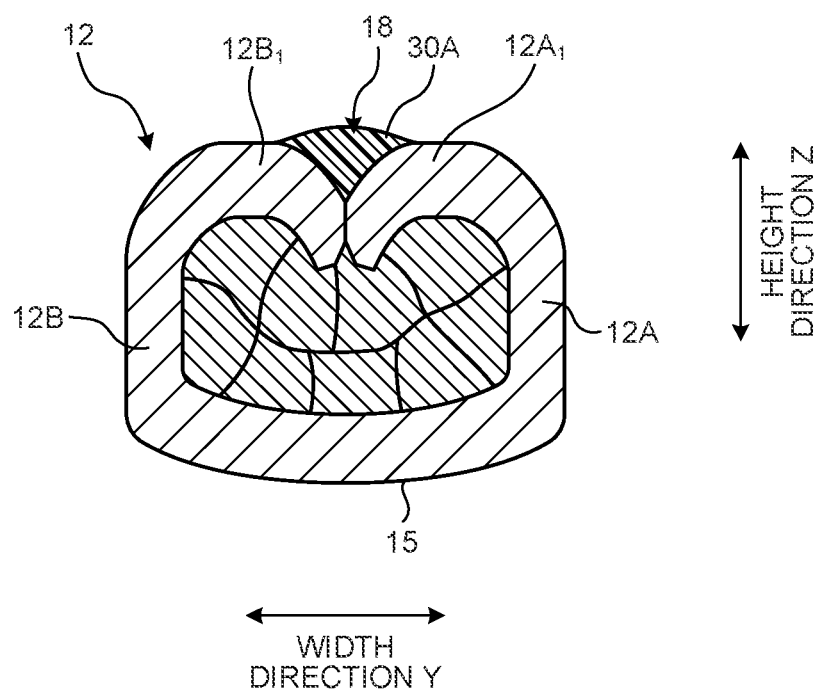
FIG. 5 is a cross-sectional view of a plane in the width direction Y and the height direction Z illustrating a first barrel after crimping according to the embodiment.

It is preferable that the anticorrosive portion 30A be also formed in a groove 18 of the first barrel 12. As illustrated in FIG. 5, the groove 18 is filled with the anticorrosive agent 30. The anticorrosive portion 30A formed in the groove 18 restricts moisture or the like from entering toward the core wire 21 through the groove 18. Further, the anticorrosive portion 30A formed in the groove 18 restricts the accumulation of moisture or the like in the groove 18. Since moisture hardly accumulates in the groove 18, deterioration of plating of the first barrel 12 is restricted.

Method of Manufacturing Terminal-Equipped Electric Wire

A method of manufacturing the terminal-equipped electric wire according to the present embodiment will be described. The method of manufacturing the terminal-equipped electric wire includes a peeling step, an adhesive member pasting step, a placing step, a crimping step, and an anticorrosive portion forming step. The peeling step is a step of peeling the vicinity of a distal end of the covering portion 22 of the electric wire 20 to expose the outer peripheral surface of the core wire 21 to the outside (forming the core wire exposed portion 21A). The adhesive member pasting step is a step of pasting the adhesive member 40 to the outer peripheral surface of the covering portion 22. The placing step is a step of placing the electric wire 20 on the crimp terminal 1 such that the adhesive member 40 pasted to the covering portion 22 in the adhesive member pasting step overlaps with the second barrel. The crimping step is a step of crimping the crimp terminal 1 to the electric wire 20. The anticorrosive portion forming step is a step of applying the anticorrosive agent 30 so as to cover at least the opening portion 14 and curing the anticorrosive agent 30 to form the anticorrosive portion 30A.

Peeling Step

In the peeling step, a peeling device (not illustrated) is used to peel off the covering portion 22 in the vicinity of the distal end of the electric wire 20 to expose the outer peripheral surface of the core wire 21, thereby forming the core wire exposed portion 21A. As the peeling device, for example, a known strip device is applied.

Adhesive Member Pasting Step

The adhesive member 40 in the present embodiment is configured such that the inner adhesive layer 42, the base member 41, the outer adhesive layer 43, and the release paper (not illustrated) are stacked in this order, and stored in the state of being wound around the core (not illustrated). The release paper is provided such that the inner adhesive layer 42 does not adhere to the outer adhesive layer 43 in the state where the adhesive member 40 is wound around the core. In the adhesive member pasting step in the present embodiment, the adhesive member 40 is aligned in a direction in which the longitudinal direction of the adhesive member 40 (corresponding to the width direction Y) and the longitudinal direction X of the electric wire 20 intersect in a state where the adhesive member 40 is cut to have a predetermined length and a release paper 44 is peeled off from the outer adhesive layer 43, and is pasted to the entire outer peripheral surface of the covering portion 22 of the electric wire 20. In this step, the inner adhesive layer 42 of the adhesive member 40 is in close contact with the entire outer peripheral surface of the covering portion 22. Incidentally, the timing of cutting the adhesive member 40 to have the predetermined length and the timing of peeling the release paper from the outer adhesive layer 43 are not limited thereto. For example, the adhesive member 40 may be cut to have the predetermined length after the inner adhesive layer 42 is pasted to the outer peripheral surface of the covering portion 22, or the release paper may be peeled from the outer adhesive layer 43 after the inner adhesive layer 42 is pasted to the outer peripheral surface of the covering portion 22.

Placing Step

As illustrated in FIG. 1, the electric wire 20 is placed on the crimp terminal 1 such that the axial direction of the electric wire 20 coincides with the longitudinal direction X of the crimp terminal 1. A distal end of the core wire 21 is directed toward the terminal connection portion 11 in the state of being placed on the crimp terminal 1. The core wire exposed portion 21A exposed to the outside from the covering portion 22 is placed on the first barrel 12. More specifically, the core wire exposed portion 21A is placed on the base portion 15 so as to be located between the first core wire caulking portion 12A and the second core wire caulking portion 12B in the width direction Y. At this time, the distal end of the core wire 21 may protrude from the first barrel 12 toward the terminal connection portion 11. On the other hand, the covering portion 22 of the electric wire 20 is arranged on the second barrel 13 with the adhesive member 40, pasted to the outer circumference of the covering portion 22, interposed therebetween. More specifically, the adhesive member 40 pasted to the outer peripheral surface of the covering portion 22 is placed on the base portion 15 so as to be located between the first covering caulking portion 13A and the second covering caulking portion 13B in the width direction Y.

Crimping Step

The crimping step is executed by the terminal crimping device 50. The terminal crimping device 50 lowers the crimper 51 toward the anvil 52 in a state where the crimp terminal 1 and the electric wire 20 are supported by the anvil 52. The core wire exposed portion 21A of the electric wire 20 is placed on the first barrel 12 of the crimp terminal 1, and the covering portion 22 is placed on the second barrel 13 together with the adhesive member 40 pasted to the outer peripheral surface of the covering portion 22. As the crimper 51 is lowered toward the anvil 52, the first core wire caulking portion 12A comes into contact with a first slope 53A of a first wall surface 53, and the second core wire caulking portion 12B comes into contact with a second slope 54A of a second wall surface 54.

A curved surface 53B of the first wall surface 53 folds the first core wire caulking portion 12A toward the second core wire caulking portion 12B side to bend the first core wire caulking portion 12A. More specifically, the first wall surface 53 bends the first core wire caulking portion 12A in a substantially J-shape such that a distal end of the first core wire caulking portion 12A faces the core wire exposed portion 21A in the height direction Z. A curved surface 54B of the second wall surface 54 folds the second core wire caulking portion 12B toward the first core wire caulking portion 12A side to bend the second core wire caulking portion 12B. More specifically, the second wall surface 54 bends the second core wire caulking portion 12B in a substantially J-shape such that a distal end of the second core wire caulking portion 12B faces the core wire exposed portion 21A in the height direction Z.

Further, the first wall surface 53 and the second wall surface 54 press the first core wire caulking portion 12A toward the second core wire caulking portion 12B side, and press the second core wire caulking portion 12B toward the first core wire caulking portion 12A side. As a result, as illustrated in FIG. 5, the first barrel 12 is crimped to the core wire exposed portion 21A so as to have the cross-sectional shape formed in a substantially B-shape. As illustrated in FIG. 5, in the first barrel 12 after crimping, bent portions 12A$_1$ and 12B$_1$ are formed in the first core wire caulking portion 12A and the second core wire caulking portion 12B, respectively. Shapes of the bent portions 12A$_1$ and 12B$_1$ are bent shapes that are convex toward a side opposite to the base portion 15 side.

The bent portion 12A$_1$ of the first core wire caulking portion 12A and the bent portion 12B$_1$ of the second core wire caulking portion 12B abut on each other. More specifically, distal ends of the bent portions 12A$_1$ and 12B$_1$ abut on each other in the width direction Y. The groove 18 is formed by the bent portions 12A$_1$ and 12B$_1$ that abut on each other. The groove 18 is a groove-shaped portion formed on the upper side of a site where the bent portions 12A$_1$ and 12B$_1$ abut on each other, and extends along the longitudinal direction X. A width of the groove 18 in the width direction Y becomes narrower toward the base portion 15.

As illustrated in FIG. 6, the second barrel 13 is crimped to the adhesive member 40 and the covering portion 22 such that the first covering caulking portion 13A and the second covering caulking portion 13B overlap with each other. For example, the first covering caulking portion 13A is wound around the outer peripheral surface of the covering portion 22 with the adhesive member 40 interposed therebetween, and the second covering caulking portion 13B is wound around the outer side of the second covering caulking portion 13B. Through the above steps, the adhesive member 40 is crimped by the second barrel 13 so that the base member 41, the inner adhesive layer 42, and the outer adhesive layer 43 are elastically compressed in the radial direction of the electric wire 20. As illustrated in FIGS. 6 and 7, the inner adhesive layer 42 adheres to the entire outer peripheral surface of the covering portion 22, and the outer adhesive layer 43 adheres to the entire inner peripheral surface 13I of the second barrel. Incidentally, a step portion 13C is formed at a site where a distal end of the first covering caulking portion 13A overlaps with the second covering caulking portion 13B as illustrated in FIG. 6, but there is no gap between the covering portion 22 and the second barrel 13 since a portion between the step portion 13C and the covering portion 22 is filled with a site where the ends 40A and 40B of the adhesive member 40 overlap with each other. Incidentally, the step portion 13C is not limited to the configuration of being filled with the ends 40A and 40B of the adhesive member 40, and the adhesive member 40 with a thickness to fill the step portion 13C may be selected, and the site where the ends 40A and 40B of the adhesive member 40 overlap with each other may be arranged in any of the inner peripheral surface 13I of the second barrel 13. Further, the ends 40A and 40B of the adhesive member 40 do not necessarily overlap, and the ends 40A and 40B may abut on each other.

Anticorrosive Portion Forming Step

Figure 8:
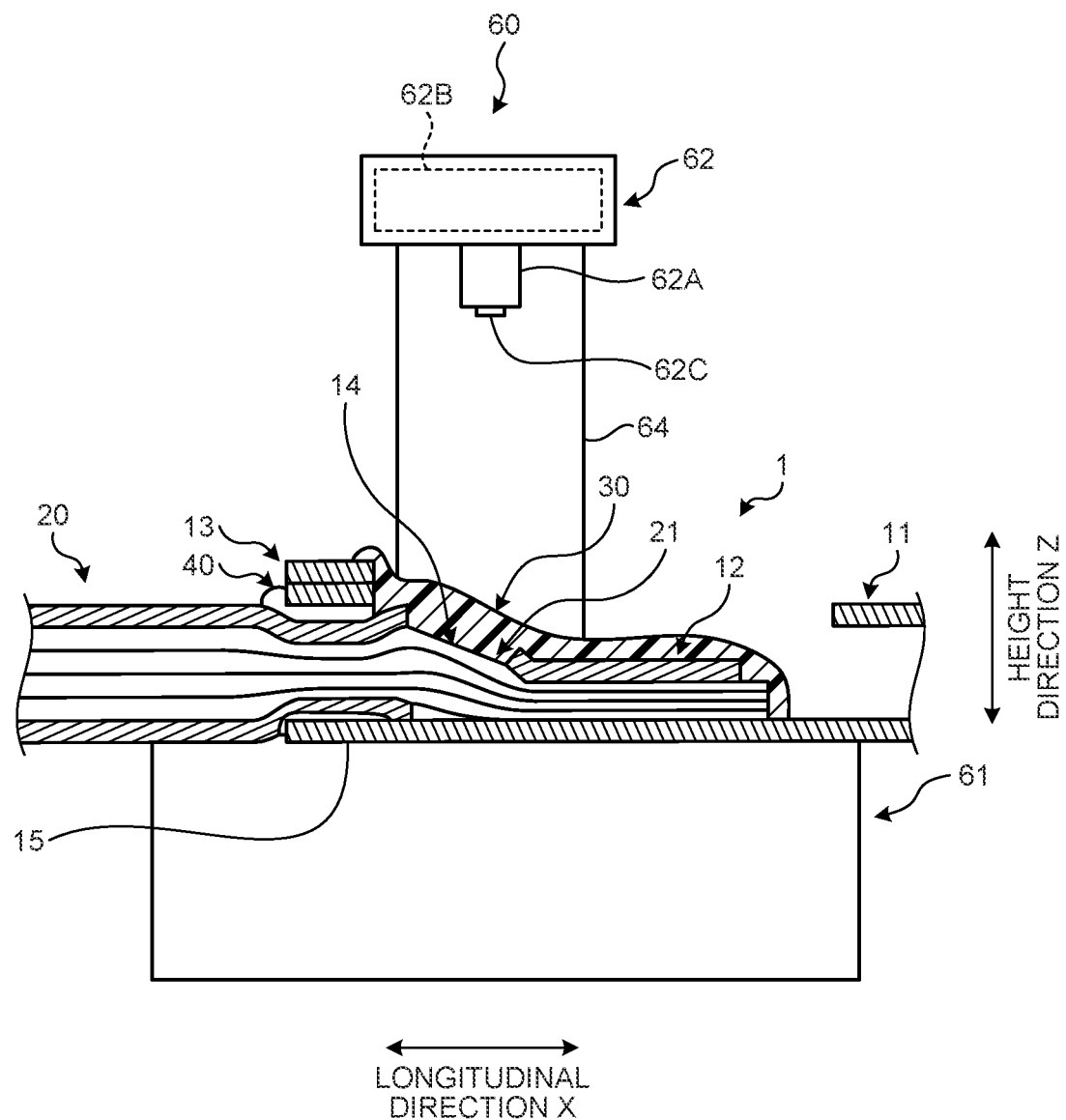
FIG. 8 is a view illustrating an ejection device according to the embodiment.

The anticorrosive portion forming step is executed by, for example, an ejection device 60 illustrated in FIG. 8 and an ultraviolet irradiation device 70 illustrated in FIG. 3. Here, the anticorrosive portion forming step will be described on the assumption that the anticorrosive agent 30 is an ultraviolet curable resin. The ejection device 60 is a device that intermittently ejects the anticorrosive agent 30. The anticorrosive agent 30 is, for example, a urethane acrylate-based resin. As illustrated in FIG. 8, the ejection device 60 includes a main body 61, an ejection unit 62, and a holding unit 63. The main body 61 is a main body portion of the ejection device 60, and is fixed to a mounting table such as a workbench. The ejection unit 62 is supported by the main body 61 via an arm 64. The ejection unit 62 has a nozzle 62A and an ejection mechanism 62B. The nozzle 62A is a hollow member having a cylindrical shape. A discharge port 62C at the distal end of the nozzle 62A faces the holding unit 63.

The ejection mechanism 62B is a mechanism that intermittently ejects the anticorrosive agent 30 from the nozzle 62A. The ejection mechanism 62B intermittently pressure-feeds a fixed amount of the anticorrosive agent 30 to the nozzle 62A by reciprocating a piston or the like. A means for applying a biasing force to the piston is, for example, a spring or a piezoelectric element. The anticorrosive agent 30 sent to the nozzle 62A ejected out from a distal end of the nozzle 62A. The anticorrosive agent 30 discharged from the nozzle 62A flies toward the holding unit 63. The holding unit 63 holds the terminal-equipped electric wire at a position facing the nozzle 62A. Therefore, the anticorrosive agent 30 discharged from the distal end of the nozzle 62A described above adheres to at least the opening portion 14 on the terminal-equipped electric wire, and wets and spreads over the entire opening portion 14, so that the anticorrosive agent 30 is applied.

The anticorrosive portion 30A is formed by curing the anticorrosive agent 30 applied to the terminal-equipped electric wire. Here, the anticorrosive agent 30 is assumed as the ultraviolet curable resin, the use of the ultraviolet irradiation device 70 is exemplified as a method of curing the anticorrosive agent 30. As illustrated in FIG. 3, when the anticorrosive agent 30 is irradiated with ultraviolet rays by the ultraviolet irradiation device 70, the anticorrosive agent 30 is cured by being irradiated with the ultraviolet rays, and the anticorrosive portion 30A is formed.

In the terminal-equipped electric wire of the present embodiment, the inner adhesive layer 42 of the adhesive member 40 adheres to the entire outer peripheral surface of the covering portion 22, and the outer adhesive layer 43 adheres to the entire circumference of the inner peripheral surface 13I of the second barrel 13. Further, the covering portion 22 is crimped by the second barrel 13 via the adhesive member 40, and thus, the adhesive member 40 is held by the second barrel 13 in the state of being elastically deformed in the radial direction of the electric wire 20. With the above configuration, for example, even if the gap between the covering portion 22 and the second barrel 13 is likely to increase due to the covering portion 22 shrinking in the radial direction because a plasticizer of the covering portion 22 diverges over time, or the electric wire 20 being bent with respect to the crimp terminal 1, the adhesive layers 42 and 43 of the adhesive member 40 are elastically restored in the state of adhering to the outer peripheral surface of the covering portion 22 and the inner peripheral surface 13I of the second barrel 13, so that the gap between the covering portion 22 and the second barrel 13 can be filled.

Although the above embodiment of the present invention has been described above, the present embodiment has been presented as an example, and is not intended to limit the scope of the invention. The above embodiment can be implemented in various other forms, and various omissions, replacements, and modifications can be made within a scope not departing from a gist of the invention. The above embodiment and its modifications are included in the invention in the claims and the equivalent scope thereof as well as included in the scope and gist of the invention.

The terminal-equipped electric wire may adopt a form other than the above-described embodiment. The terminal-equipped electric wire of the present embodiment adopts the form in which the covering caulking portions 13A and 13B overlap with each other when the first covering caulking portion 13A and the second covering caulking portion 13B of the second barrel 13 caulk the covering portion 22, that is, a so-called overlap-type caulking form, but is not limited to this caulking form. For example, a caulking form in which distal ends of the covering caulking portions 13A and 13B abut against the covering portion 22, that is, a so-called round clip type caulking form may be adopted. Even in this case, the effect of the present invention can be achieved by arranging the adhesive member 40 between the covering portion 22 and the second barrel 13.

In the case of the round clip type caulking form, a gap sometimes occurs between the distal ends of the covering caulking portion 13A and 13B due to a manufacturing error of the crimp terminal 1 or the electric wire 20. At that time, strictly speaking, the adhesive member 40 is not interposed between the entire outer peripheral surface of the covering portion 22 and the inner peripheral surface 13I of the second barrel 13. Even in such a case, the waterproof effect described in the present invention is sufficiently achieved if a configuration is adopted in which the anticorrosive portion 30A enters the gap and is in close contact with the adhesive member 40.

In a terminal-equipped electric wire according to the present embodiment, a plasticizer of a covering portion volatilizes due to the influence of heat or the like so that a diameter of the entire electric wire becomes smaller over time, but a second barrel (crimp terminal) does not change in dimension over time. Thus, a gap between the covering portion and the second barrel gradually increases, Therefore, by applying a configuration of claim 1, an adhesive member is interposed between the covering portion and the second barrel while being elastically deformed. Thus, even if deformation occurs such that the gap between the covering portion and the second barrel increases, a base member and an adhesive layer are elastically restored while the adhesive layer adheres to the covering portion and the second barrel to follow the deformation between the covering portion and the second barrel. As a result, it is possible to suppress generation of the gap between the covering portion and the second barrel due to the deformation that the diameter of the covering portion becomes smaller over time or the like, and it is possible to prevent entry of water or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-equipped electric wire comprising:
   an electric wire that has a core wire made of a conductor and a covering portion made of an insulating material covering a periphery of the core wire; and
   a crimp terminal that has a base portion extending along an axial direction; a first barrel which extends from the base portion in an intersecting direction that intersects the axial direction, and is crimped in a state of surrounding an outer circumference of a core wire exposed portion in which an outer peripheral surface of the core wire in the electric wire located between the first barrel and the base portion is exposed to the outside; a second barrel which extends from the base portion in the intersecting direction, is located on a rear side of the first barrel in the axial direction, and is crimped in a state of surrounding an outer circumference of the covering portion of the electric wire; and an opening portion in which the core wire exposed portion and the covering portion are exposed to an outside between the first barrel and the second barrel, wherein
   an anticorrosive portion made of an insulating material is formed so as to cover at least the opening portion,
   an adhesive member having a base member and adhesive layers formed on both sides of the base member is arranged on the covering portion,
   the adhesive member is held in an elastically deformed state in a state where the second barrel crimps the covering portion, an inner adhesive layer adheres to the outer circumference of the covering portion, and an outer adhesive layer adheres to an inner circumference of the second barrel so as to follow an inner peripheral surface in the state where the second barrel crimps the covering portion,
   the second barrel includes an end surface that extends away from the inner circumference, and
   the adhesive member extends outside of the second barrel in the axial direction and abuts the end surface of the second barrel.

2. A method of manufacturing a terminal-equipped electric wire that includes an electric wire having a core wire made of a conductor and a covering portion made of an insulating material covering a periphery of the core wire, and a crimp terminal having: a base portion extending along an axial direction; a first barrel which extends from the base portion in an intersecting direction that intersects the axial direction; a second barrel which extends from the base portion in the intersecting direction, is located on a rear side of the first barrel in the axial direction, the method comprising:
- a peeling step of peeling the covering portion of the electric wire to form a core wire exposed portion;
- an adhesive member pasting step of pasting an adhesive member onto the covering portion before contacting the core wire to the crimp terminal, the adhesive member having a base member and adhesive layers formed on both sides of the base member of the electric wire such that the adhesive layer wraps a whole circumference of the covering portion;
- a placing step of placing the electric wire with respect to the crimp terminal before crimping such that the second barrel and the adhesive member overlap;
- a crimping step of crimping the electric wire and the crimp terminal by crimping the first barrel onto an outer circumference of the core wire and the second barrel onto the adhesive member and the covering portion such that a core wire exposed portion and the covering portion are exposed to an outside between the first barrel and the second barrel; and
- an anticorrosive portion forming step of applying an anticorrosive agent to at least the opening portion and curing the anticorrosive agent to form an anticorrosive portion.

* * * * *